US010000292B1

(12) United States Patent
Haynes et al.

(10) Patent No.: US 10,000,292 B1
(45) Date of Patent: Jun. 19, 2018

(54) MULTIPURPOSE LANE DIVIDER FOR EVACUATION SLIDE

(71) Applicant: GOODRICH CORPORATION, Charlotte, NC (US)

(72) Inventors: Timothy C. Haynes, Prescott Valley, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days. days.

(21) Appl. No.: 15/663,166

(22) Filed: Jul. 28, 2017

(51) Int. Cl.
*A62B 1/20* (2006.01)
*B64D 25/14* (2006.01)

(52) U.S. Cl.
CPC ............... *B64D 25/14* (2013.01); *A62B 1/20* (2013.01)

(58) Field of Classification Search
CPC .................................. B64D 25/14; A62B 1/20
USPC .................. 193/25 A, 25 B; 244/137.2, 905
See application file for complete search history.

(56) References Cited

U.S. PATENT DOCUMENTS

| 3,470,991 | A | * | 10/1969 | Holcombe | ............... | A62B 1/20 |
| | | | | | | 193/25 B |
| 3,827,094 | A | * | 8/1974 | Fisher | ...................... | A62B 1/20 |
| | | | | | | 182/48 |
| 3,833,088 | A | * | 9/1974 | Chacko | .................. | B64D 25/14 |
| | | | | | | 182/48 |
| 3,845,920 | A | * | 11/1974 | Satterfield | .............. | B64D 25/14 |
| | | | | | | 182/48 |
| 4,332,049 | A | * | 6/1982 | Fisher | ...................... | A62B 1/20 |
| | | | | | | 169/48 |
| 4,333,546 | A | * | 6/1982 | Fisher | .................... | B64D 25/14 |
| | | | | | | 182/48 |
| 4,519,782 | A | * | 5/1985 | Fisher | ...................... | A62B 1/20 |
| | | | | | | 182/48 |

FOREIGN PATENT DOCUMENTS

EP 003435 3/1986

* cited by examiner

*Primary Examiner* — William R Harp
(74) *Attorney, Agent, or Firm* — Snell & Wilmer, L.L.P.

(57) ABSTRACT

An evacuation system may comprise an evacuation slide and a lane divider. A portion of the lane divider may be detachably coupled to a sliding surface of the evacuation slide. A detachable restraint may be disposed between the lane divider and the evacuation slide. The detachable restrain may comprise a first portion coupled to the lane divider and a second portion coupled to the sliding surface. The first portion of the detachable restraint may detachably couple to the second portion of the detachable restraint.

17 Claims, 4 Drawing Sheets

MULTIPURPOSE LANE DIVIDER FOR EVACUATION SLIDE

FIELD

The present disclosure relates to aircraft evacuation systems and, in particular, to an evacuation slide having a multipurpose lane divider.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. A canopy for providing shelter, after a water landing, may be included with the evacuation system, as set forth by various governmental agencies. Current canopy designs tend to employ a waterproof canopy, which can be tied or otherwise secured to the slide/raft, and canopy support tubes configured to provide distance between the canopy and the sliding surface. The canopy supports tubes may be integral to the side rails of the slide/raft such that the support tubes inflate upon inflation of the slide or the canopy supports tubes may be distinct components that are manually attached to the slide and orally inflated by an evacuee. The support tubes tend to add extra weight to the evacuation system while serving a single purpose (i.e., canopy support). Further, inflating and/or attaching the support tubes can be difficult in high wind conditions.

SUMMARY

An evacuation system may comprise an evacuation slide and a lane divider attached to the evacuation slide. A portion of the lane divider may be detachably coupled to a sliding surface of the evacuation slide.

In various embodiments, the lane divider may be in fluid communication with the evacuation slide. A detachable restraint may be disposed between the lane divider and the evacuation slide. The detachable restraint may comprise a first portion coupled to the lane divider and a second portion coupled to the sliding surface. The first portion of the detachable restraint may detachably couple to the second portion of the detachable restraint. The detachable restraint may comprise at least one of a hook-and-loop type fastener, a snap-fastener, or speed lacing.

In various embodiments, a lanyard may be coupled to the lane divider and the evacuation slide. The lanyard may maintain the lane divider in a substantially orthogonal position relative to the sliding surface. A canopy may be disposed over the evacuation slide. The lane divider may support the canopy and maintain a distance between the canopy and the sliding surface. A canopy connector may be attached to a tip of the lane divider. A support connector may be attached to the canopy.

In various embodiments, a first end of the lane divider may comprise a conical shape. The lane divider may be configured to rotate away from the sliding surface.

A slide for an evacuation system may comprise a sliding surface and a lane divider detachably coupled to the sliding surface.

In various embodiments, the lane divider may be in fluid communication with the slide. A detachable restraint may be disposed between the sliding surface and the lane divider. A first portion of the detachable restraint may be coupled to a first end of the lane divider and a second portion of the detachable restraint may be coupled to the sliding surface.

In various embodiments, a lanyard may be coupled to the lane divider. The lanyard may maintain the lane divider in a position substantially orthogonal to the sliding surface. A first end of the lane divider may rotate away from the sliding surface. The first end of the lane divider may comprise a conical shape. A second end of lane divider may be integral with the slide.

A method of making an evacuation system may comprise attaching a lane divider to an evacuation slide, and configuring a first end of the lane divider to rotate away from a sliding surface of the evacuation slide.

In various embodiments, the method may further comprise disposing a detachable restraint between the lane divider the sliding surface. In various embodiments, lane divider may be in fluid communication with the evacuation slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards the reference component.

Evacuation systems of the present disclosure may include inflatable slides having a multipurpose lane divider. The lane divider may include a portion that is detachably coupled to the inflatable slide, such that a first end of the lane divider may be rotated away from a sliding surface of the inflatable slide. Thus, the lane divider, when attached, may serve to divide the sliding surface into multiple sliding lanes, allowing for faster evacuation of passengers, and in the event of a water landing, the lane divider may be erected (i.e., pivoted away from a sliding surface) to serve as a canopy support.

Figure 1:
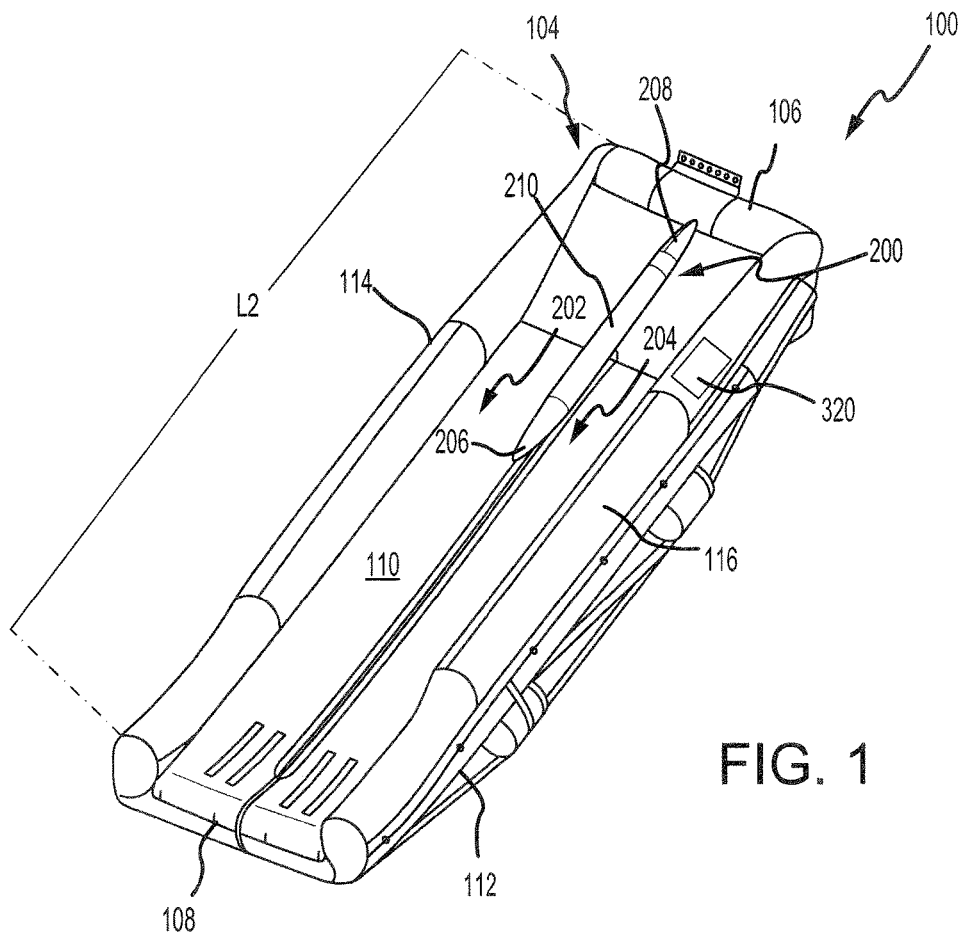
FIG. 1 illustrates a perspective view of an evacuation slide in a deployed position with a multipurpose lane divider in a slide mode position, in accordance with various embodiments.

With reference to FIG. 1, an evacuation system 100 is illustrated, in accordance with various embodiments. Evacuation system 100 may comprise an evacuation slide 104. FIG. 1 illustrates evacuation slide 104 in an inflated and/or deployed position. Evacuation slide 104 may be deployed from an aircraft. Evacuation slide 104 may comprise an inflatable slide. Evacuation slide 104 may comprise a head end 106 and a toe end 108 opposite head end 106. Head end 106 may be coupled to an aircraft structure. Upon deployment, toe end 108 may contact an exit surface (e.g., the ground or the water) in response to evacuation slide 104 being deployed. In the event of a water landing, evacuation slide 104 may be uncoupled from the aircraft structure and serve as a life raft.

Figure 2:
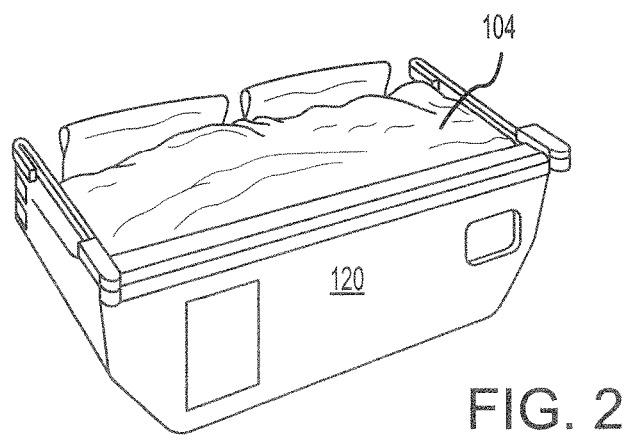
FIG. 2 illustrates a perspective view of an evacuation slide in a stowed position, in accordance with various embodiments.

Referring to FIG. 2, evacuation slide 104 is illustrated in a stowed and/or packed position. In this regard, evacuation slide 104 may be stowed in a packboard 120. In various embodiments, evacuation slide 104 may be folded in the stowed position. In various embodiments, evacuation slide 104 may be deployed from packboard 120 in response to opening an emergency exit door. Packboard 120 may be coupled to an aircraft in an installed position. Typically, a packboard 120 includes a blow-out panel which opens in response to deployment of evacuation slide 104 and through which the inflatable slide may exit the packboard 120. In this regard, evacuation slide 104 may be configured to be deployed from an aircraft.

Returning to FIG. 1, evacuation slide 104 may comprise a sliding surface 110 and an underside surface 112 opposite sliding surface 110. Sliding surface 110 may extend from head end 106 to toe end 108. Evacuation slide 104 may comprise a first side rail 114 and a second side rail 116. First side rail 114 and second side rail 116 may be disposed on opposing sides of evacuation slide 104, and may extend from head end 106 to toe end 108. First side rail 114 and second side rail 116 may be integrally formed and in fluid communication. Stated differently, first side rail 114 and second side rail 116 may be part of a one interconnected chamber that fills with gas upon deployment of evacuation slide 104.

Evacuation system 100 comprises a multipurpose lane divider 200. Lane divider 200 may be attached to evacuation slide 104. Lane divider 200 may divide evacuation slide 104 into two lanes. For example, lane divider 200 may divide sliding surface 110 into a first slide lane 202 and a second slide lane 204. Lane divider 200 may be located approximately half way between first side rail 114 and second side rail 116.

Lane divider 200 may comprise a first end 206 oriented toward toe end 108, a second end 208 located proximate head end 106, and a connecting member 210 connecting first end 206 and second end 208. In various embodiments, with momentary combined reference to FIG. 1 and FIG. 4, lane divider 200 may comprise a length L1 extending from first end 206 to second end 208. Slide 104 may comprise a length L2 extending from head end 106 to toe end 108. In various embodiments, length L1 may be between 10% and 50% of length L2. In various embodiments, length L1 may be between 20% and 40% of length L2 of slide 104.

Figure 3:
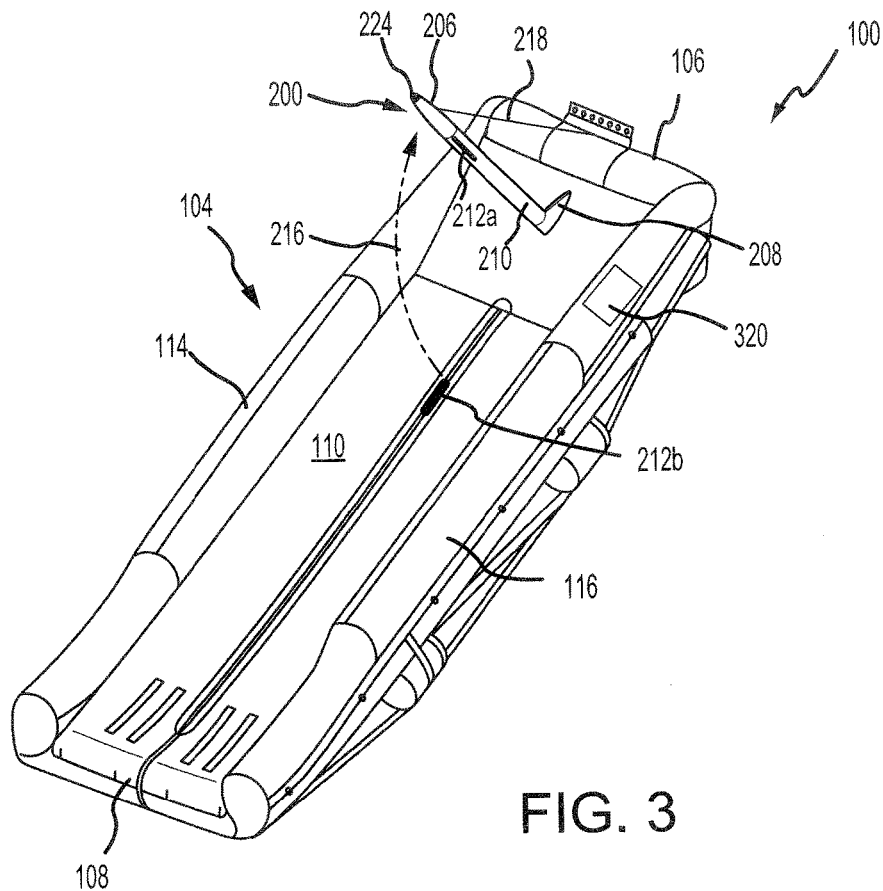
FIG. 3 illustrates a perspective view of an evacuation slide in a deployed position with a multipurpose lane divider in a canopy mode position, in accordance with various embodiments.
Figure 4:
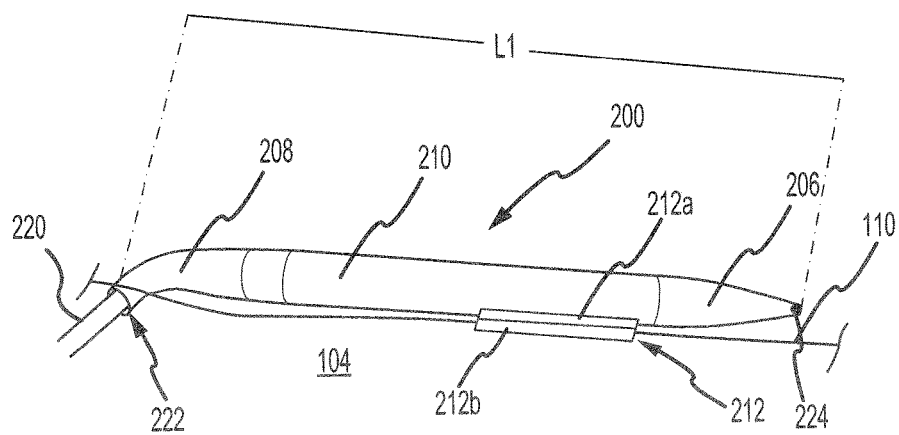
FIG. 4 illustrates a multipurpose lane divider for an evacuation slide, in accordance with various embodiments.

Referring to FIG. 4, lane divider 200 may be releasably coupled to slide 104. For example, a portion (e.g., connecting member 210 and/or first end 206) may be detachably coupled to sliding surface 110. A detachable restraint 212 may detachably couple lane divider 200 to sliding surface 110. For example, a first portion 212a of detachable restraint 212 may be attached to lane divider 200, and a second portion 212b of detachable restraint 212 may be attached to sliding surface 110. Second portion 212b may be configured to engage first portion 212a. When first portion 212a is engaged by second portion 212b, lane divider remains proximate to sliding surface 110. When first portion 212a is disengaged from second portion 212b, first end 206 of lane divider 200 may be rotated away from sliding surface 110, as shown in FIG. 3.

Detachable restraint 212 may include, hook-and-loop fasteners, snap-fasteners, speed lacing, or other detachable fastener. A hook-and-loop type fastener (also referred to as a hook-and-pile fastener, touch fastener, or VELCRO®) is comprised of two sections, one section having an array of hook-like projections that engage an array of loop-like projections of a second section. A snap-fastener (also referred to as a press stud, a snap, or a tich button) is also comprised of two sections, one having a stud, projection, or lip that can be pressed into engagement with a complementary groove, receptacle, socket, or orifice to create a resistance and/or interference fit between the two sections. Speed lacing may comprise a lace threaded through a first set of openings defined by lane divider 200 and second set of opening defined by sliding surface 110. In various embodiments, the first portion 212a of the detachable restraint 212 may include a first section of hook-and-loop material (e.g., one of either an array of hooks or an array of loops) or first snap-fastener elements (e.g., one of either a male stud or a female receptacle) or first openings, while the second portion 212b of the detachable restraint 212 may include a second section of hook-and-loop material (e.g., the other of the array of hooks or the array of loops) or second snap-fastener elements (e.g., the other of the male stud or the female receptacle), or a second set of openings. Accordingly, an evacuee may rotate first end 206 and connecting member 210 away from sliding surface 110 by detaching the first portion 212a of detachable restraint 212 from second portion 212b of detachable restraint (e.g., by detaching the first section of hook-and-loop material from the second section of hook-and-loop material, by detaching the first snap-fastener elements from the second snap-fastener elements, or by removing the lace from the first and second openings.

In various embodiments, first portion 212a of detachable restraint may be attached to connecting member 210 and/or first end 206 of lane divider 200. The location, length, and/or number of detachable restraints disposed along lane divider 200 may be selected such that detachable restraint 212 will not unintentionally detach. For example, the location, length, and/or number of detachable restraints disposed along lane divider 200 may be selected such that the force exerted by evacuees jumping onto sliding surface 110 will not lead to separation of first portion 212a from second portion 212b. In various embodiments, first end 206 and second end 208 of lane divider 200 may each comprise a generally conical shape, and connecting member 210 may comprise a generally cylindrical shape.

Second end 208 of lane divider 200 may be integrally formed with evacuation slide 104. In various embodiments, as evacuation slide 104 inflates, lane divider 200 will inflate. Stated another way, lane divider 200 may be in fluid communication with slide 104 such that upon deployment of evacuation slide 104, gas may begin to flow into slide 104 and into lane divider 200. For example, gas may flow into lane divider 200 via a conduit 220 and/or opening 222 in second end 208 of lane divider 200.

Upon inflation, lane divider 200 may serve as divider to separate sliding surface 110 into first slide lane 202 and second slide lane 204 (FIG. 1). In the event of a water landing, lane divider 200 may be released (i.e., uncoupled) from sliding surface 110 and may serve as a canopy support tube. For example, lane divider 200 may be configured such that, when uncoupled from sliding surface 110, first end 206 and connecting member 210 may be rotated away from sliding surface 110.

With reference to FIG. 3, evacuation slide 104 is illustrated in a deployed position with lane divider 200 in a canopy support position, in accordance with various embodiments. Detachable restraint 212 may be configured to separate in response to an evacuee pulling lane divider 200 away from sliding surface 110. Upon release of detachable restraint 212, lane divider 200 may be rotated away from sliding surface 110 (i.e., in the direction of arrow 216). Lane divider 200 may be rotated in the direction of arrow 216 until connecting member 210 is substantially orthogonal to sliding surface 110. Stated another way, lane divider 200 may be rotated in the direction of arrow 216 until an angle formed by connecting member 210 and sliding surface 110 is approximately 90 degrees. As used herein only, "approximately" means±10 degrees.

In various embodiments, a lanyard 218 may be coupled between lane divider 200 and slide 104. For example, lanyard 218 may be coupled to first end 206 of lane divider 200 and to head end 106. Lanyard 218 may maintain lane divider 200 in a substantially orthogonal position relative to sliding surface 110. As used herein only, "substantially orthogonal" means between 80 degrees and 100 degrees relative to sliding surface 110. Lanyard 218 may comprise a rope, tape, ribbon, webbing, or any other suitable strap.

Figure 5:
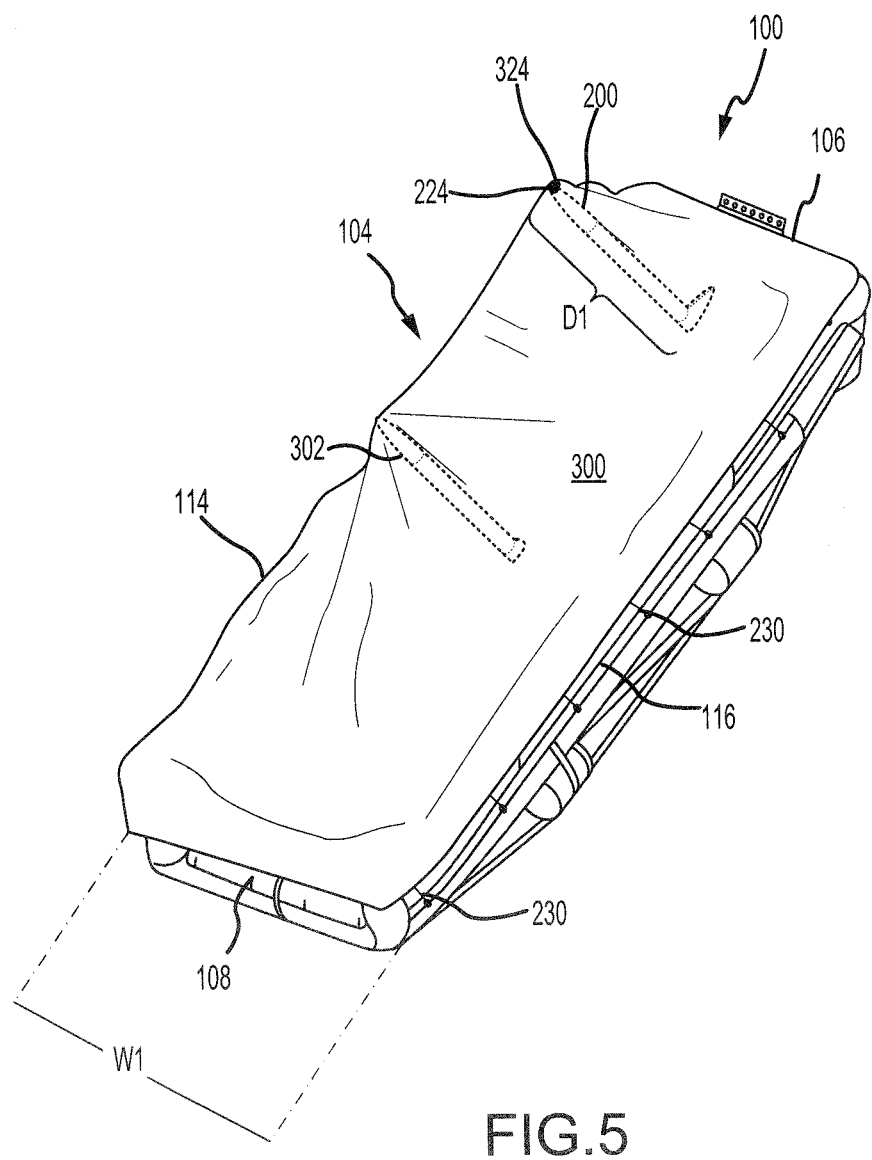
FIG. 5 illustrates a canopy attached to an evacuation slide having a multipurpose lane divider, in accordance with various embodiments.

Referring to FIG. 5, evacuation system 100 may include a canopy 300. Canopy 300 may be included in a canopy kit 320 (FIG. 3) stored on and/or attached to slide 104. Canopy 300 may be disposed over slide 104 to provide shelter and protect evacuees from rain, sun, and/or wind. Canopy 300 may be tied to side rails 114 and 116 via ties 230. Lane divider 200 may support canopy 300 and maintain a distance D1 between canopy 300 and sliding surface 110. In various embodiments, lane divider 200 may be maintained in an upright position (i.e., in a substantially orthogonal position relative to sliding surface 110) by a compressive force applied to lane divider 200 by canopy 300. Stated another way, the tautness with which canopy 300 is tied to side rails 114 and 116 may hold lane divider 200 in the upright position (i.e., prevent first end 206 lane divider 200 from rotating toward sliding surface 110 (FIG. 1)). In various embodiments, one or more additional, canopy support(s) 302 may be included in the canopy kit 320. In various embodiments, the additional canopy support(s) 302 may be manually inflated and attached to slide/raft 104 to provide additional support for canopy 300.

With combined reference to FIG. 4 and FIG. 5, in various embodiments, a canopy connector 224 may be included on the tip of first end 206 (i.e., on the portion of first end 206 that will contact canopy 300). A support connector 324 may be included on the surface of canopy 300 that is oriented toward lane divider 200. Canopy connector 224 may be configured to detachably couple to support connector 324. For example, canopy connector 224 may include a first section of hook-and-loop material (e.g., one of either an array of hooks or an array of loops) or first snap-fastener elements (e.g., one of either a male stud or a female receptacle) or a first tie, while support connector 324 may include a second section of hook-and-loop material (e.g., the other of the array of hooks or the array of loops) or second snap-fastener elements (e.g., the other of the male stud or the female receptacle), or a second tie. Accordingly, an evacuee may secure lane divider 200 to canopy 300 by coupling canopy connector 224 to support connector 324 (e.g., by attaching the first section of hook-and-loop material to the second section of hook-and-loop material, by attaching the first snap-fastener element to the second snap-fastener element, or by tying the first tie to the second tie). While canopy connector 224 and support connector 324 may aid in the attachment of canopy 300 to lane divider 200, canopy connector 224 and support connector 324 may also allow an evacuee to orient canopy 300 in a proper direction. In other words, support connector 324 may provide a visual cue allowing an evacuee to quickly find the center of canopy 300.

Lane divider 200 serving as a canopy support may reduce the number of canopy support(s) 302 included in canopy kit 320 (FIG. 3). For example, a canopy support for head end 106 may be eliminated from canopy kit 320. Lane divider 200 serving as a canopy support may also eliminate the need or reduce the number of canopy supports along side rails 114 and 116. Further, lane divider 200 dividing sliding surface into slide lanes 202 and 204 (FIG. 1) may allow a width WI of slide 104 to be reduced, as slides having a physical barrier between lanes generally have narrower width requirements. Accordingly, lane divider 200 serving multiple purposes (i.e., serving as both a lane divider and a canopy support) may lead to a reduction in the materials included in canopy kit 320 and/or to a reduction in the overall size and inflatable volume of slide 104 which may result in less cost, less weight, less manufacturing materials and time, faster inflation, and quicker, more intuitive installation of canopy 300 in adverse conditions.

Figure 6:
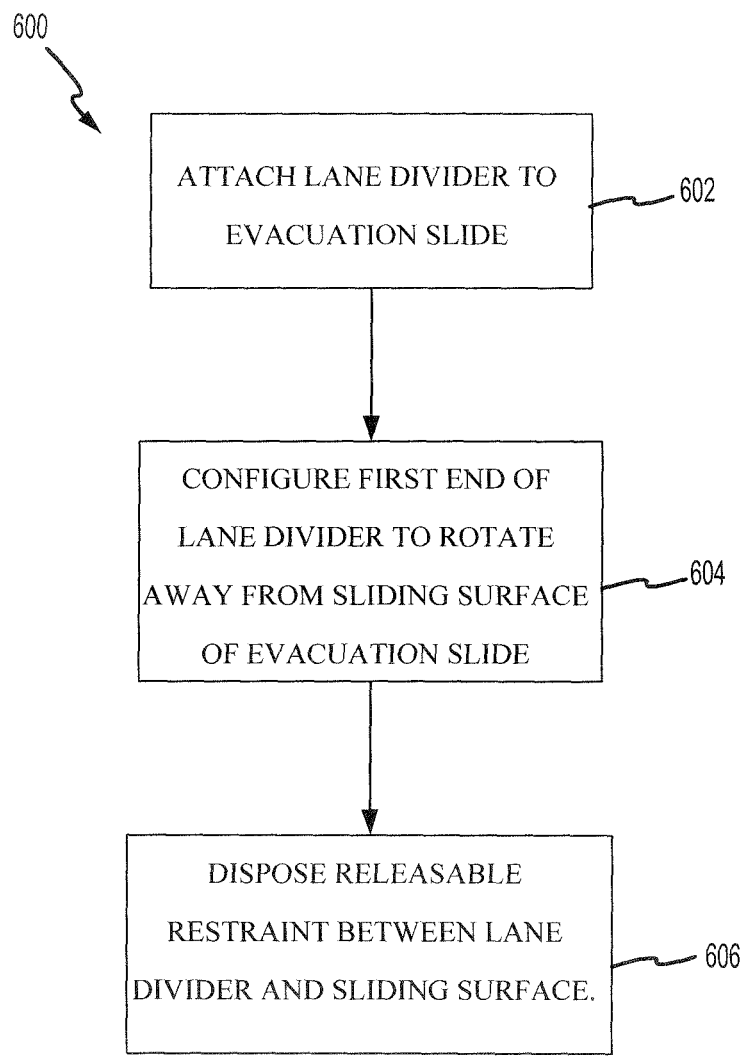
FIG. 6 illustrates a method of making an evacuation system, in accordance with various embodiments.

With reference to FIG. 6, a method 600 of making an evacuation system is illustrated, in accordance with various embodiments. Method 600 may comprise attaching a lane divider to an evacuation slide (step 602), and configuring a first end of the lane divider to rotate away from a sliding surface of the evacuation slide (step 604). Method 600 may further comprise disposing a detachable restraint between the lane divider and the sliding surface (step 606).

In various embodiments, with combined reference to FIGS. 3 and 6, step 602 may comprise attaching lane divider 200 to evacuation slide 104. Step 604 may comprise configuring first end 206 of lane divider 200 to rotate away from sliding surface 110 of evacuation slide 104. Step 606 may comprise disposing detachable restraint 212 between lane divider 200 and sliding surface 110. In various embodiment, lane divider 200 may be in fluid communication with evacuation slide 104. In various embodiments, disposing detachable restraint 212 between lane divider 200 and sliding surface 110 may comprise coupling first portion 212a of detachable restraint 212 to lane divider 200 and coupling second portion 212b of detachable restraint 212 to sliding surface 110.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system, comprising:
   an evacuation slide; and
   a lane divider attached to the evacuation slide, wherein a portion of the lane divider is detachably coupled to a sliding surface of the evacuation slide, and wherein the lane divider is configured to rotate away from the sliding surface.

2. The evacuation system of claim 1, wherein the lane divider is in fluid communication with the evacuation slide.

3. The evacuation system of claim 1, further including a detachable restraint disposed between the lane divider and the evacuation slide, the detachable restraint comprising:
   a first portion coupled to the lane divider; and
   a second portion coupled to the sliding surface, wherein the first portion of the detachable restraint detachably couples to the second portion of the detachable restraint.

4. The evacuation system of claim 3, wherein the detachable restraint comprises at least one of a hook-and-loop type fastener, a snap-fastener, or speed lacing.

5. The evacuation system of claim 1, further including a lanyard coupled to the lane divider and the evacuation slide, wherein the lanyard maintains the lane divider in a substantially orthogonal position relative to the sliding surface.

6. The evacuation system of claim 1, further including a canopy disposed over the evacuation slide, wherein the lane divider supports the canopy and maintains a distance between the canopy and the sliding surface.

7. The evacuation system of claim 6, further including:
   a canopy connector attached to a tip of the lane divider; and
   a support connector attached to the canopy.

8. The evacuation system of claim 1, wherein a first end of the lane divider comprises a conical shape.

9. A slide for an evacuation system, comprising:
   a sliding surface;
   a lane divider detachably coupled to the sliding surface; and
   a detachable restraint disposed between the sliding surface and the lane divider, wherein a first portion of the detachable restraint is coupled to the lane divider, and a second portion of the detachable restraint is coupled to the sliding surface.

10. The slide of claim 9, wherein the lane divider is in fluid communication with the slide.

11. The slide of claim 9, further including a lanyard coupled to the lane divider, wherein the lanyard maintains the lane divider in a position substantially orthogonal to the sliding surface.

12. The slide of claim 9, wherein a first end of the lane divider rotates away from the sliding surface.

13. The slide of claim 12, wherein the first end of the lane divider comprises a conical shape.

14. The slide of claim 12, wherein a second end of lane divider is integral with the slide.

15. A method of making an evacuation system, comprising:
   attaching a lane divider to an evacuation slide; and
   configuring a first end of the lane divider to rotate away from a sliding surface of the evacuation slide.

16. The method of claim 15, further including disposing a detachable restraint between the lane divider and the sliding surface.

17. The method of claim 15, wherein the lane divider is in fluid communication with the evacuation slide.

* * * * *